United States Patent [19] [11] 4,430,904

Fogelberg [45] Feb. 14, 1984

[54] MULTIPLE SPEED RATIO TRANSMISSION WITH ANTI-CLASH BRAKE

[75] Inventor: Mark J. Fogelberg, Muncie, Ind.

[73] Assignee: Borg-Warner Corporation, Chicago, Ill.

[21] Appl. No.: 295,410

[22] Filed: Aug. 24, 1981

[51] Int. Cl.[3] ........................ F16H 57/10; G05G 5/10; G05G 9/00; B60K 41/26

[52] U.S. Cl. ........................ 74/411.5; 74/477; 192/4 A

[58] Field of Search .............. 74/411.5, 477; 192/4 C, 192/4 A; 188/83, 77 R, 82.6

[56] References Cited

U.S. PATENT DOCUMENTS

| | | | |
|---|---|---|---|
| 2,328,851 | 9/1943 | Shackleton et al. | 188/77 R |
| 2,636,578 | 4/1953 | Swift | 188/77 R |
| 2,839,941 | 6/1958 | Rugen | 192/4 A |
| 3,500,701 | 3/1970 | Gussenbauer | 188/77 R |
| 3,554,047 | 1/1971 | Stott | 74/477 |
| 3,722,633 | 3/1973 | Wenderoth | 188/83 |
| 3,929,029 | 12/1975 | Kelbel | 74/473 R |
| 4,031,977 | 6/1977 | Grosseau | 192/4 A |
| 4,054,181 | 10/1977 | Grosseau | 192/4 A |
| 4,128,151 | 12/1978 | Grosseau | 192/4 A |
| 4,225,024 | 9/1980 | Kuzma | 74/411.5 |
| 4,294,338 | 10/1981 | Simmons | 74/411.5 |
| 4,332,312 | 6/1982 | Sabel et al. | 192/4 C |
| 4,337,675 | 7/1982 | Holdeman | 74/337.5 |

FOREIGN PATENT DOCUMENTS

| | | | |
|---|---|---|---|
| 2751699 | 5/1979 | Fed. Rep. of Germany | 74/411.5 |
| 54-98451 | 8/1979 | Japan | 74/411.5 |
| 2056597 | 3/1981 | United Kingdom | 74/411.5 |
| 2056598 | 3/1981 | United Kingdom | 74/411.5 |

*Primary Examiner*—Lawrence J. Staab
*Assistant Examiner*—Michael D. Bednarek
*Attorney, Agent, or Firm*—Julian Schachner

[57] ABSTRACT

A multiple speed ratio transmission includes constantly meshed gears defining a plurality of forward speed ratios, a reverse idler gear slidable into meshing relationship with the constantly meshed gears to define a reverse speed ratio, control means including a selector and an interlock for selecting and engaging the gear ratios, and an anti-clash brake mechanism for retarding rotation of the constantly meshed gears prior to engagement of the reverse idler gear therewith. The brake mechanism includes a friction ring on one of the constantly meshed gears, and an arm extending from the interlock for blocking rotation of the friction ring when the selector is moved so as to select the reverse speed ratio.

4 Claims, 5 Drawing Figures

10
44
42
56
54
52
50
58
22
20
40
18
14
16
12
34
33
59
36
32
26
30
38
28
24
1
3
N
2
4
R

MULTIPLE SPEED RATIO TRANSMISSION WITH ANTI-CLASH BRAKE

BACKGROUND OF THE INVENTION

This invention relates generally to an automotive transmission or the like. More particularly, it relates to a multiple speed ratio transmission with apparatus for retarding gear rotation when a non-synchronized gear is to be engaged.

In recent years there have been many improvements in automotive drive trains, including improvements relating to devices for shifting manual transmissions. Generally, for transmissions incorporating a plurality of forward speed ratios and a reverse speed ratio, the shift control apparatus provides appropriate crossover positions for the shift stick. Each crossover position selects a shift fork or the like, which may be moved to engage a speed ratio. In a four speed and reverse transmission, for example, one crossover position might select the first and second forward speed ratios, another the third and fourth forward speed ratios, and yet another the reverse speed ratio.

Copending U.S. application Ser. No. 153,128 filed May 27, 1980 discloses shift control apparatus wherein a shift stick is movable laterally to rotate a shift rail about its longitudinal axis for crossover selection. In each crossover position the shift stick is movable longitudinally to slide the shift rail along its axis so as to engage the selected speed ratio. In the first and second positions, the shift rail is slidable to engage respectively the first or second forward speed ratio and the third or fourth forward speed ratio. In the third position, the shift rail is slidable to engage the reverse speed ratio.

When the reverse idler gear slides in the gear-engaging direction, it comes into meshing engagement with other gears in the reverse gear train. As these other gears may be rotating as part of a constant mesh transmission, it is desirable to brake them before this meshing engagement takes place in order to avoid the clashing of gears.

Copending U.S. application Ser. No. 92,886 filed Nov. 9, 1979 discloses shift control apparatus including a modified synchronizer which functions as a countershaft brake. This is a complicated, expensive brake mechanism which takes effect after crossover selecion; that is, during the reverse gear-engaging movement of the reverse idler gear. In some instances this may not be soon enough to avoid gear clash.

Thus, there remains a need in the art for a simple, inexpensive brake mechanism which will be effective to eliminate gear clash in a transmission of the type disclosed.

SUMMARY OF THE INVENTION

A primary object of this invention is to meet the need noted above. To that end, there is provided shift control apparatus which may be incorporated in a multiple speed ratio transmission having, for example, four synchronized forward speed ratios and a reverse speed ratio. The apparatus includes a simple, inexpensive brake for retarding rotation of the constantly meshed gears during crossover selection, prior to meshing engagement of the reverse idler gear in the reverse gear train.

A gapped friction ring has an interference fit on a drum portion of any one of the constantly meshed gears. The ring is provided with a tab extending radially outwardly adjacent the gap. An arm is formed as part of the interlock included in the shift control apparatus. When the shift stick is in any crossover position which selects a forward speed ratio, the arm is out of the path of the ring, and the ring merely rotates with the gear. The arm is arranged to move into the path of the tab on the ring when the shift stick is moved laterally toward the crossover position which selects the reverse speed ratio. In the reverse crossover position, the arm abuts the tab and stops the ring from rotating. The resulting slip causes frictional drag between the ring's inside diameter and the drum portion of the gear, which is a sufficient braking action to retard rotation of the constantly meshed gears. This avoids or greatly reduces gear clash as the reverse idler gear is brought into meshing relationship with the constantly meshed gears.

BRIEF DESCRIPTION OF THE DRAWINGS

The objects and the advantages of this invention will become apparent to those skilled in the art upon careful consideration of the specification herein, including the drawings, wherein.

Figures 1, 2:
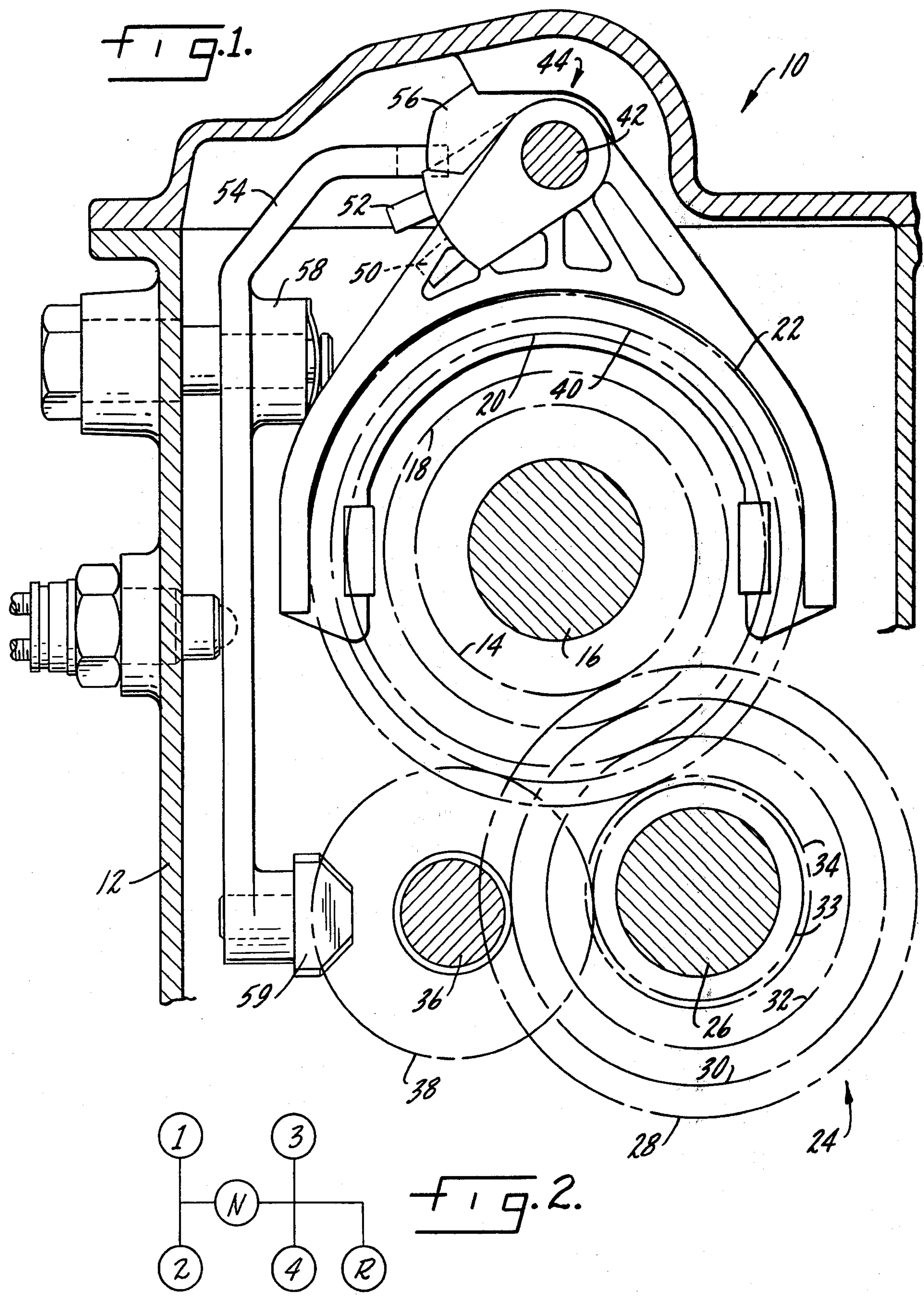
FIG. 1 is a cut-away view of a four speed transmission, partially in section, showing the overall relationship of the components, with some structure simplified or omitted for clarity.
FIG. 2 is a diagrammatic view illustrating the four speed shift pattern.
Figure 3:
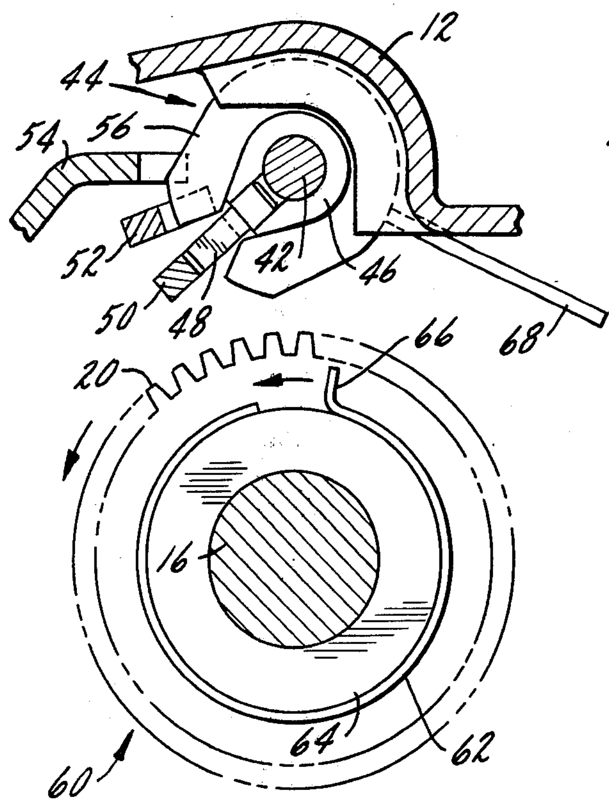
FIG. 3 is a sectional view showing details of the brake mechanisms in one position thereof, with some structure simplified or omitted for clarity.
Figure 4:
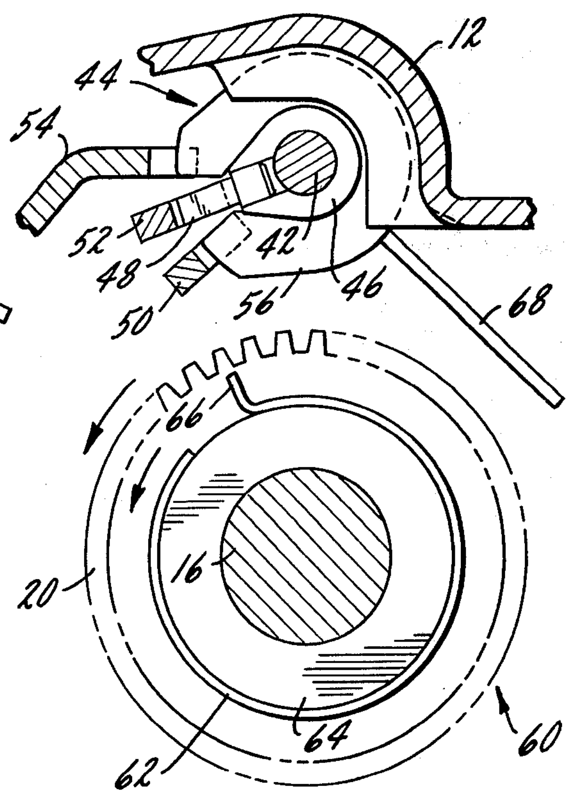
FIG. 4 is a sectional view similar to FIG. 3 showing another position of the brake mechanism.

While this invention is susceptible of embodiment in many different forms, a preferred embodiment is shown in the drawings and described in detail. It should be understood that the present disclosure is considered to be an exemplification of the principles of the invention, and is not intended to limit the invention to this embodiment.

DESCRIPTION OF A PREFERRED EMBODIMENT

Referring now to the drawings in greater detail, there is shown generally a multiple speed ratio transmission 10 adapted for use in an automotive vehicle. Transmission 10 includes a transmission housing 12. An input shaft (not shown) is journalled in housing 12 and is adapted to receive torque from an associated vehicle engine through an appropriate clutch (not shown). The input shaft defines an input gear 14. An output shaft 16 (coaxial with the input shaft) is journalled in housing 12. Output gears 18, 20 and 22 are journalled on output shaft 16.

A cluster gear assembly 24 includes a countershaft 26 journalled in housing 12. Defined by countershaft 26 is a drive gear 28 in mesh with input gear 14. Similarly, there are defined a countershaft gear 30 in mesh with output gear 18, a countershaft gear 32 in mesh with output gear 20, a countershaft gear 33, and a countershaft gear 34 in mesh with output gear 22.

A reverse idler shaft 36 is supported in housing 12. A reverse idler gear 38 is journalled on shaft 36 and is slidable relative thereto.

As disclosed in the aforementioned U.S. application Ser. No. 153,128, a first synchronizing clutch (not shown) is supported by output shaft 16 and defines an output gear 40. Gears 33 and 40 are in alignment when the first synchronizing clutch is in its neutral position, such that reverse idler gear 38 is slidable into and out of mesh with them to define a reverse gear train. A second synchronizing clutch (not shown) also is supported by output shaft 16.

A shift rail 42 is supported in housing 12 for rotation about and longitudinal sliding movement along its own axis. A suitable shift control apparatus 44 is associated with shift rail 42. Details of such an apparatus are disclosed in U.S. Pat. No. 3,929,029 issued Dec. 30, 1975. Briefly, shift control apparatus 44 includes a selector 46 secured to shift rail 42 for movement therewith. Selector 46 supports a depending finger 48. First and second shift forks 50 and 52 and a lever 54 are oriented such that finger 48 is rotated into selective alignment with one of them upon rotational movement of shift rail 42 during crossover selection. Upon longitudinal sliding movement of shift rail 42, finger 48 carries the selected fork or lever longitudinally.

An interlock 56 is rotatable with selector 46 but is restrained from longitudinal sliding movement by housing 12. Upon rotational movement of shift rail 42, interlock 56 engages those forks or lever not selected by finger 48, thus preventing them from moving longitudinally.

As disclosed in the aforementioned U.S. application Ser. No. 153,128, shift forks 50 and 52 are engaged respectively with the first and second synchronizing clutches. Lever 54 is pivotable about a fulcrum 58 and is engaged through a suitable pad 59 the reverse idler gear 38.

Shift rail 42 is rotatable to first, second and third crossover positions. In the first two positions, selector 46 is in alignment respectively with shift forks 50 and 52. In the third position, selector 46 is in alignment with lever 54. Once crossover selection has been made, longitudinal movement of shift rail 42 engages the selected speed ratio according to the shift pattern illustrated in FIG. 2.

It should be noted that transmission 10 is of the constant mesh variety, with all of the gears except reverse idler gear 38 being driven by input gear 14. Selected output gears are engagable with output shaft 16 to engage the various speed ratios. Reverse idler gear 38 is slidable on reverse idler shaft 36 into and out of meshing engagement with countershaft gear 33 and output gear 40.

If it is assumed that the vehicle engine is running, the clutch is engaged and transmission 10 is in neutral, all of the gears except reverse idler gear 38 would be rotating. Gear 38 would be out of mesh with gears 33 and 40.

When shifting from neutral into reverse, an operator would disengage the clutch, at which point the constantly meshed gears would start spinning down. Then the operator would first move his associated shift stick laterally to rotate shift rail 42 to the crossover position in which finger 48 is in alignment with lever 54, and second move his shift stick longitudinally to slide shift rail 42 longitudinally. This would pivot lever 54 about fulcrum 58, and slide reverse idler gear 38 into meshing engagement with gears 33 and 40. If this meshing relationship were to be completed before rotation of gears 33 and 40 had stopped, a clashing of gears would result.

An anti-clash brake mechanism 60 is provided to initiate braking of the constantly meshed gears during crossover selection and prior to movement of reverse idler gear 38. Brake mechanism 60 includes a gapped friction ring 62 having an interference diametral fit on a cylindrical drum portion 64 of any of the gears in constant mesh. By way of example, drum portion 64 might be formed as part of output gear 20. Friction ring 62 is formed with a tab 66 extending radially outwardly at one end thereof adjacent the gap.

Brake mechanism 60 also includes an arm 68 extending from interlock 56 and rotatable therewith. The orientation is such that when finger 48 is in alignment with either shift fork 50 or 52, arm 68 is out of the rotational path of tab 66. Accordingly, friction ring 62 is free to rotate with gear 20. However, when finger 48 is in alignment with lever 54, arm 68 is in the rotational path of tab 66, thereby blocking rotation of friction ring 62 with gear 20. The frictional braking force developed thereby tends to retard rotation of gear 20 and all of the other constantly meshed gears rotating in transmission 10. This braking action typically is sufficient to stop rotation of gears 33 and 40 before reverse idler gear 38 is moved longitudinally into meshing relationship therewith.

A test of a typical transmission as described herein shows that without brake mechanism 60, the rotating gears may be expected to stop within 5.0 seconds after clutch disengagement. With brake mechanism 60, the rotating gears may be expected to stop within approximately 0.7 second after clutch disengagement. Thus, it is believed that brake mechanism 60 would prevent or greatly reduce the clashing of gears during engagement of the reverse speed ratio by retarding rotation of gears 33 and 40 before gear 38 is moved into meshing relationship with them.

Brake mechanism 60 prevents gear clash and thus reduces wear and noise in transmission 10. Further, the brake is engaged only when the transmission is shifted to engage a non-synchronized gear such as reverse idler gear 38. Thus, the brake does not contribute to parasitic losses within the transmission when a synchronized gear is engaged.

The aforementioned U.S. application Ser. No. 153,128 also discloses a five speed transmission including an overdrive speed ratio. The contribution of brake mechanism 60 to parasitic losses within such a transmission when operating in overdrive is believed to be negligible due to the fact that the vehicle engine is running relatively slowly when the transmission is in overdrive.

Figure 5:
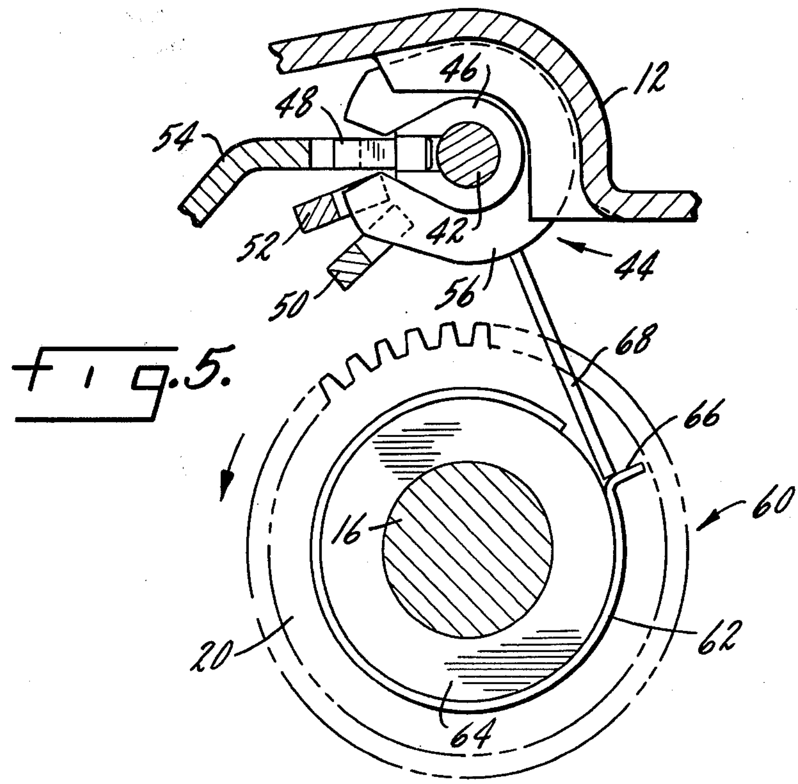
FIG. 5 is a sectional view similar to FIG. 3 showing yet another position of the brake mechanism.

It is preferable to arrange friction ring 62 on gear 20 such that friction due to slip therebetween, as illustrated in FIG. 5, develops a braking force tending to loosen rather than tighten the grip of friction ring 62. This arrangement eliminates drastic changes in the transmitted torque, which is an exponential function of the coefficient of friction in a ring tightening condition, but for all practical purposes is independent of the coefficient of friction in a ring loosening condition. This effectively eliminates the necessity to consider oil viscosity, temperature, surface friction of the slipping machine elements, etc. when designing the brake mechanism into a transmission.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. In a multiple speed ratio transmission having constantly meshed gears defining a plurality of forward speed ratios, a reverse idler gear slidable into meshing engagement with the constantly meshed gears to define a reverse speed ratio, and control means including a selector and an interlock for selecting and engaging the speed ratios; the improvement comprising an anti-clash brake mechanism for retarding rotation of the constantly meshed gears prior to engagement of the reverse idler gear therewith, said brake mechanism including a friction ring on one of the constantly meshed gears, and an arm extending from the interlock for blocking rotation of the friction ring when the selector is moved so as to select the reverse speed ratio.

2. A multiple speed ratio transmission comprising an input shaft, an output shaft, a plurality of constantly meshed gears defining a plurality of speed ratios, another gear movable into meshing relationship with said constantly meshed gears for defining another speed ratio, said speed ratios being selectively engageable for establishing torque delivery paths between said input and output shafts, control means movable sequentially for first selecting and then engaging said speed ratios, and means for applying a frictional braking force to one of said constantly meshed gears upon movement of said control means for selection of said other speed ratio, said braking means including a friction ring having an interference fit on said one constantly meshed gear for rotation therewith, said friction ring having an outwardly extending tab, and means for blocking rotation of said friction ring upon movement of said control means for selection of said other speed ratio, said blocking means including an arm movable into the rotational path of said tab in response to movement of said control means for selection of said other speed ratio, said control means including a selector rotatable on an axis for selecting one of said speed ratios and slidable on said axis for engaging said one speed ratio, and an interlock rotatable with said selector for locking the remainder of said speed ratios against engagement upon sliding of said selector on said axis for engaging said one speed ratio, said arm extending from said interlock for rotation therewith into said rotational path of said tab.

3. The transmission of claim 2, said friction ring having a gap, and said transmission being constructed and arranged such that the fit of said friction ring on said one constantly meshed gear tends to loosen upon application of said frictional braking force.

4. The transmission of claim 2 or 1, said plurality of speed ratios being forward speed ratios, and said other speed ratio being a reverse speed ratio.

* * * * *